(12) United States Patent
Deazley et al.

(10) Patent No.: US 8,870,123 B2
(45) Date of Patent: Oct. 28, 2014

(54) DUAL PURPOSE DEPLOYMENT LINE FOR A PARACHUTE SYSTEM

(71) Applicants: Frank Deazley, Kissimmee, FL (US); Scott Hilton, Kissimmee, FL (US)

(72) Inventors: Frank Deazley, Kissimmee, FL (US); Scott Hilton, Kissimmee, FL (US)

(73) Assignee: Aerial Delivery Solutions, LLC, Kissimmee, FL (US)

( * ) Notice: Subject to any disclaimer, the term of this patent is extended or adjusted under 35 U.S.C. 154(b) by 144 days.

(21) Appl. No.: 13/772,446

(22) Filed: Feb. 21, 2013

(65) Prior Publication Data

US 2014/0097298 A1  Apr. 10, 2014

Related U.S. Application Data

(60) Provisional application No. 61/744,842, filed on Oct. 4, 2012.

(51) Int. Cl.
*B64D 17/62* (2006.01)
*B64D 1/08* (2006.01)

(52) U.S. Cl.
CPC . *B64D 17/62* (2013.01); *B64D 1/08* (2013.01)
USPC .......................................... 244/149; 244/147

(58) Field of Classification Search
CPC ........ B64D 17/30; B64D 17/32; B64D 17/38; B64D 17/52
USPC ...... 244/147, 148, 149, 151 R, 151 A, 151 B; 294/82.25
See application file for complete search history.

(56) References Cited

U.S. PATENT DOCUMENTS

| | | | |
|---|---|---|---|
| 4,337,913 A * | 7/1982 | Booth | 244/151 B |
| 4,837,931 A | 6/1989 | Beermann | |
| 5,303,721 A | 4/1994 | Bowen | |
| 5,715,602 A | 2/1998 | Hage | |
| D425,658 S | 5/2000 | Stahl | |
| 6,216,346 B1 | 4/2001 | Wechsler | |
| 6,382,564 B1 * | 5/2002 | Sego, Jr. | 244/151 A |
| 6,604,712 B2 * | 8/2003 | Kurtgis | 244/137.4 |
| 7,003,883 B2 | 2/2006 | Tapper | |
| 7,922,123 B2 | 4/2011 | Deazley | |
| 8,025,254 B2 * | 9/2011 | Sadeck | 244/151 B |
| 2005/0001099 A1 * | 1/2005 | Auvray | 244/151 A |
| 2007/0044322 A1 | 3/2007 | Trbovich | |
| 2009/0294594 A1 * | 12/2009 | Deazley | 244/149 |
| 2010/0001140 A1 * | 1/2010 | McHugh et al. | 244/148 |
| 2011/0121138 A1 * | 5/2011 | Walsh et al. | 244/149 |
| 2011/0155857 A1 * | 6/2011 | Deazley | 244/151 B |

* cited by examiner

*Primary Examiner* — Joseph W Sanderson
*Assistant Examiner* — Christopher Hutchens
(74) *Attorney, Agent, or Firm* — Allen, Dyer, Doppelt, Milbrath & Gilchrist, P.A.

(57) ABSTRACT

A dual purpose deployment line for a parachute system is disclosed. The system includes a main line and a plurality of cascading release loops disposed proximate a first end of the main line. The plurality of cascading release loops are configured to be releasably secured to an aircraft anchor ring. The deployment line includes a release pin secured to a first end of the release line, where the release pin is in communication with the plurality of cascading release loops and adapted to pull free and release the cascading release loops from the anchor ring when a parachute is deployed. An optional locking pin is adapted to selectively secure the plurality of cascading release loops in place when desired to retain the deployment line to the anchor ring when the parachute is deployed and the release pin is pulled free.

18 Claims, 3 Drawing Sheets

DUAL PURPOSE DEPLOYMENT LINE FOR A PARACHUTE SYSTEM

I. CROSS REFERENCE TO RELATED APPLICATIONS

This application claims the benefit of U.S. provisional patent application Ser. 61/744,842 filed Oct. 4, 2012.

II. FIELD

The present disclosure is generally related to a dual purpose deployment line for a parachute system.

III. DESCRIPTION OF RELATED ART

Parachute systems have been used for many years to safely drop and deliver cargo from an aircraft. Typical parachute systems include a deployment bag, a parachute, and a deployment line (e.g., static line) connected to the deployment bag and parachute canopy. The parachute system is generally secured to the cargo using restraints or straps.

In a "direct bag" deployment configuration, the deployment line is first anchored to the aircraft. The cargo is then deployed causing tension in the deployment line resulting in the deployment bag to be opened and the canopy to separate from the deployment line and the deployment bag. The dangling deployment line and deployment bag may then be retrieved and brought into the aircraft by a crewman.

In a "release away" deployment configuration used in high altitudes, the need for the crewman to retrieve the deployment line and deployment bag from outside the aircraft is eliminated. Instead of retrieving the deployment line and deployment bag as in the "direct bag" configuration, the deployment line and deployment bag are released with the cargo. One type of "release away" deployment configuration includes a connector between two segments of the deployment line, and a locking loop configured to hold the connector in place. Accordingly, when tension is applied to the deployment line as the cargo is deployed, the locking loop releases the connector so that the deployment bag and a section of the deployment line are released along with the cargo. A problem with the current "release away" configuration is that the force required to release the locking loop increases exponentially with the amount of tension in the deployment line. In addition, twisting of the deployment line causes problems with the release.

Another type of "release away" deployment configuration uses a "three ring system" to release the deployment line from the aircraft upon deployment of the cargo. This reduces the forces required to release the deployment line from the aircraft. However, hard rings being extracted from the aircraft uncontrolled can strike and damage the aircraft and or the parachute.

Another shortcoming of the existing "direct bag" and "release away" deployment systems is that the current deployment lines only allow for one configuration or the other while packing the parachute and do not allow for mission change in the aircraft. In addition the crewman cannot visibly determine which type of parachute system has been packed or which packing method was used to pack the system, "direct bag" or "release away." Thus misidentifying a parachute system as "direct bag" instead of "release away", or vice versa, may cause significant problems and damage.

Accordingly, what is needed in the art is a dual purpose deployment line for a parachute system that allows for a single parachute packing method, easy configuration identification in the aircraft and also allows for mission change in the aircraft.

IV. SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In a particular embodiment, a dual purpose deployment line for a parachute system is disclosed. The system includes a main line and a plurality of cascading release loops disposed proximate a first end of the main line. The plurality of cascading release loops are configured to be releasably secured to an aircraft anchor ring. In addition, a second end of the main line is adapted to be secured to a parachute deployment bag and a release line is routed along the main line.

The deployment line also includes a release pin secured to a first end of the release line, where the release pin is in communication with the plurality of cascading release loops and adapted to pull free and release the cascading release loops from the anchor ring when a parachute is deployed. A second end of the release line is adapted to be secured to a retention ring or other suitable retention device and a retention line is secured to the retention ring, where a second end of the retention line secured to the parachute. An optional locking pin is adapted to selectively secure the plurality of cascading release loops in place when desired to retain the deployment line to the anchor ring when the parachute is deployed and the release pin is pulled free.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

IV. BRIEF DESCRIPTION OF THE DRAWINGS

V. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
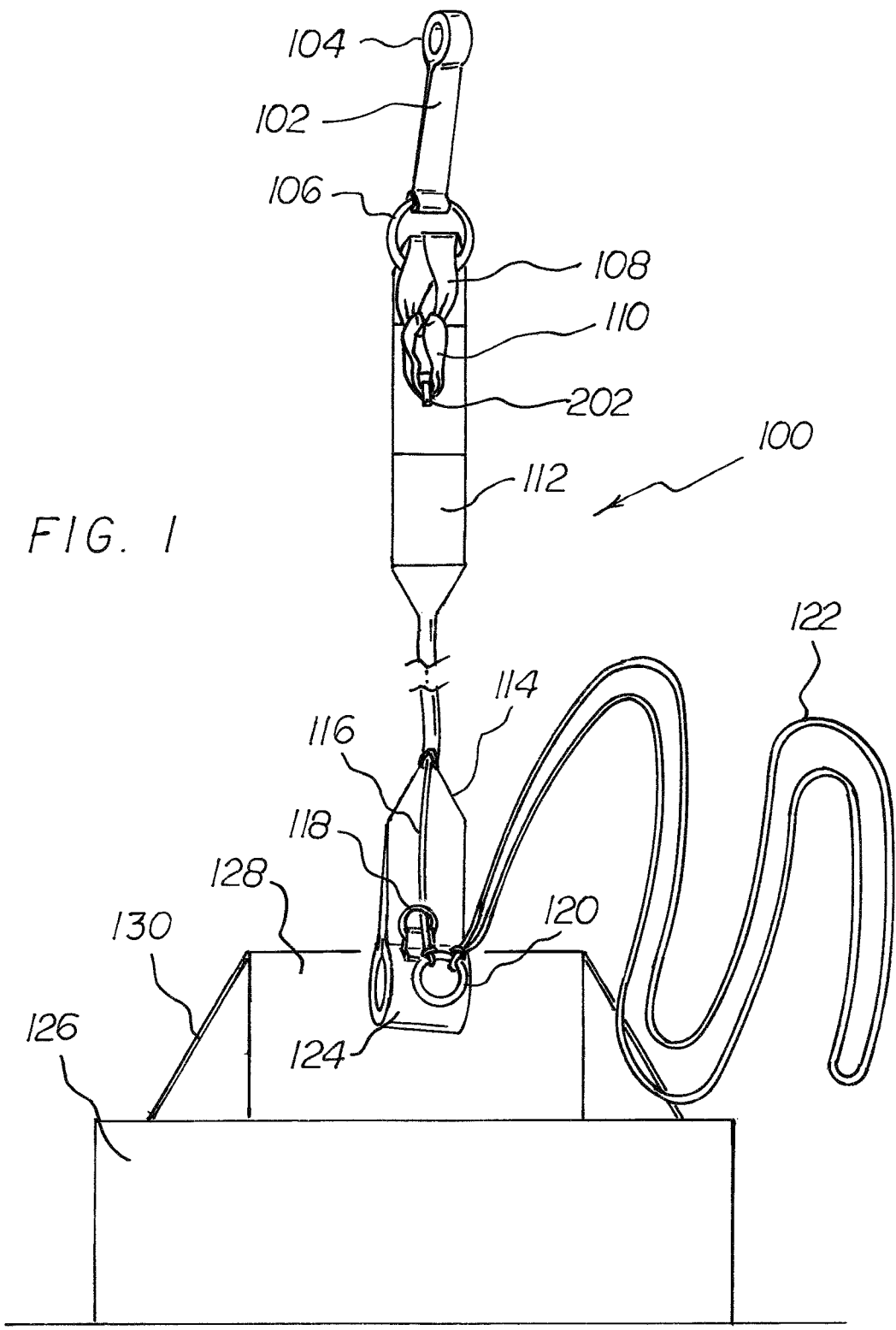
FIG. 1 is an elevation view of a particular embodiment of a dual purpose deployment line for a parachute system.

Referring now to FIG. 1, a dual purpose deployment line for a parachute system is disclosed and generally designated 100. Parachute systems are used for aerially delivering cargo from an aircraft to a ground location. The parachute systems may include static deployment lines to enable deployment of a parachute upon deployment of the cargo from an aircraft. As shown in FIG. 1, the cargo 126 is secured to a parachute deployment bag 128 containing a parachute. The deployment bag 128 may be secured to the cargo 126 using straps 130 or other securement means. The dual purpose deployment line 100 is used to connect the cargo 126 to the aircraft until deployed. The dual purpose deployment line 100 is preferably used with a parachute system suitable for delivering cargo from an altitude. Cargo risers may be used to suspend the cargo 126 from the parachute following deployment.

Figure 2:
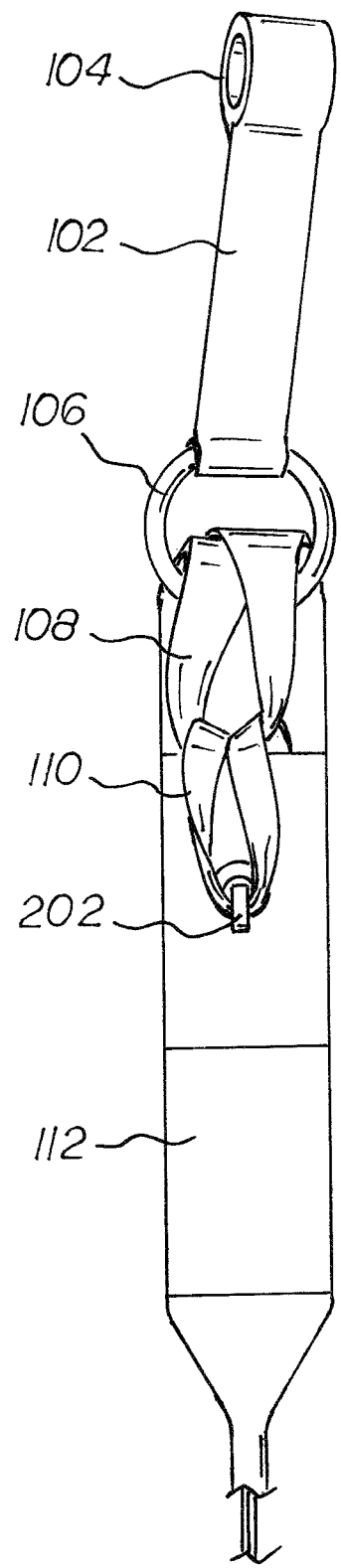
FIG. 2 is a front view of a section of the dual purpose deployment line shown in FIG. 1.

FIG. 2 is a front view of the dual purpose deployment line 100. The configurations that may be used with the dual purpose deployment line 100 includes: (1) a "release away" deployment where the deployment line 100 and parachute deployment bag 128 completely detaches from the aircraft as the parachute deploys as intended; and (2) a "direct bag" deployment where the deployment line 100 and parachute deployment bag 128 stay with the aircraft while the parachute works as intended. The dual purpose deployment line 100 allows a user to decide and select which configuration is required and to change to that configuration just prior to deploying the cargo from an aircraft.

Figure 3:
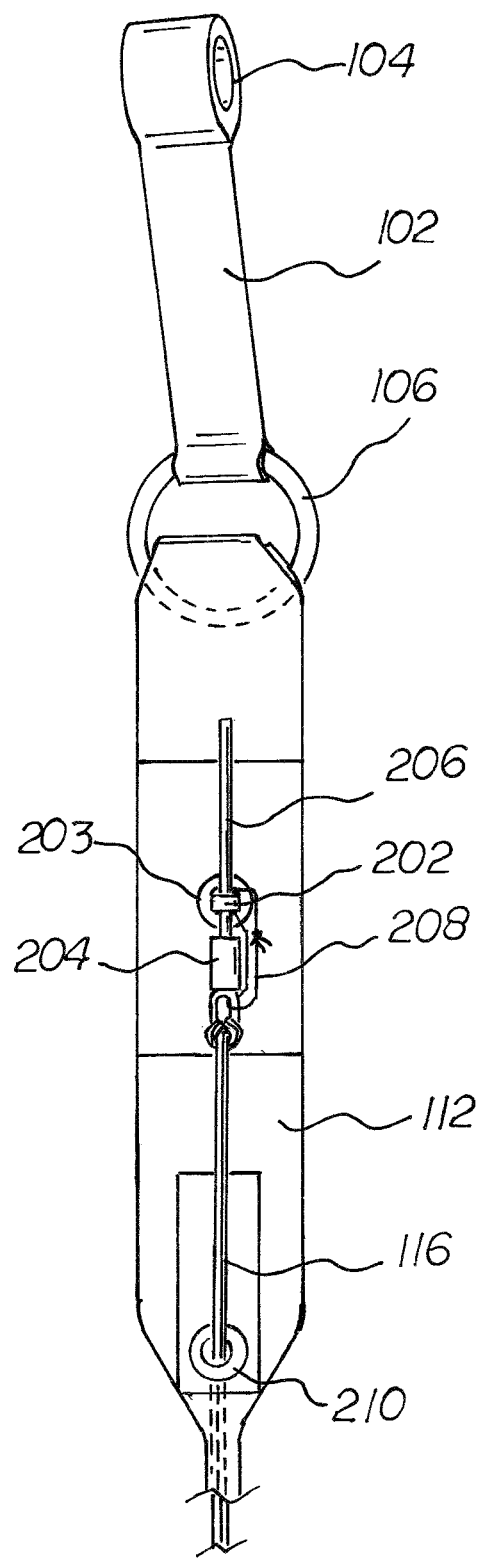
FIG. 3 is a rear view of the section of the dual purpose deployment line shown in FIG. 2 in a release away configuration.

As shown in FIGS. 2 and 3, the deployment line 100 is configured in the "release away" configuration, where the deployment line 100 is configured to be released with the cargo 126 and the deployment bag 128. The dual purpose deployment line 100 may include a main line 112, which includes a plurality of cascading release loops 108, 110, 202. An anchor line 102 includes an anchor ring 106 on a first end to releasably connect to the release loops 108, 110, 202, and an eye 104 on an opposing second end, where the eye 104 is adapted to be secured to the aircraft using an aircraft anchor cable, for example. The main line 112 and loops 108, 110, 202 may be fabricated of a material with a desired strength for tolerating loads and stresses related to the deployment of parachutes and their associated loads. The materials may include textile materials such as braided nylon, nylon webbing, polyester webbing, cotton webbing, and any other suitable material. The materials used may be sewn or otherwise fabricated into a design or shape such that a desired shape and strength may be obtained.

The materials of the main line 112 and loops 108, 110, 202 may be non-metallic materials that have no potential to damage an aircraft during deployment of the cargo when the deployment line 100 is at least partially outside the aircraft and flapping relatively uncontrollably. Existing deployment lines include metallic rings that often damage an aircraft during deployment and increase danger when retrieving the deployment line in a direct bag deployment. Accordingly, minimizing size and number of metallic rings in the deployment line 100 reduces risk and damage, particularly to the parachute canopy.

As described above, the anchor line 102 has a second end adapted to be connected to the aircraft using the eye 104 or other similar means, such as, for example, a carabineer type connector, or any other suitable configuration allowing connection and disconnection of the dual purpose deployment line 100 to the aircraft. A first end of the anchor line 102 is adapted to receive the anchor loop 108 using an anchor ring 106. The cascading release loops 108, 110, 202 may be configured to allow the deployment line 100 and deployment bag 128 to either release with the parachute (i.e., "release away" configuration) or remain with the aircraft (i.e., "direct bag" configuration). Although the cascading release loops 108, 110, 202 are described in the context of a three loop system, more or fewer loops may be used as desired. For example, the dual purpose deployment line 100 may include three, four, five, six, or more cascading loops, depending on potential load and length of the deployment line 100, among other things.

The anchor loop 108, intermediate loop 110, and locking loop 202, as well as any additional loops, may be sewn or riveted, for example, directly to the main line 112. The anchor ring 106 may be secured to the anchor line 102. The anchor line 102 and anchor ring 106 are adapted to support a load associated with cargo 126. The anchor ring 106 may be sized based on the load to be attached.

In use, the anchor loop 108 is passed or routed through anchor ring 106, and the intermediate loop 110 passed through the anchor loop 108, with each loop folded over to restrain the loop under it. The intermediate loop 110 may be restrained, as shown in FIG. 2, by a locking loop 202 configured to pass through the intermediate loop 110 and through a grommet 203 in the main line 112. As shown in FIG. 3, a release pin 206 may be passed through the locking loop 202 to prevent the locking loop 202 from releasing the intermediate loop 110, which releases the anchor loop 108, until the release pin 206 is pulled free. The release pin 206 may further include a safety tie 208 to minimize the risk of accidental or premature removal.

The release pin 206 is connected to a release line 116 via head 204, so that upon a force being exerted on the release line 116 from the parachute deployment, the release pin 206 is pulled free from the locking loop 202, thereby allowing the intermediate loop 110 to be released. Accordingly, the anchor loop 108 is subsequently released by the intermediate loop 110, resulting in separation of the main line 112 from the anchor ring 106 in this "release away" configuration. The release line 116 is adapted to pass slidably through a sleeve or pocket of the main line 112 to avoid the release line 116 from becoming tangled or otherwise encumbered.

The main line 112 includes a deployment bag loop 124 to be connected to an opening mechanism associated with parachute deployment bag 128 such that, upon a force being applied to the deployment bag loop 124 when deploying a parachute system from an aircraft, the cargo loop 124 may cause actuation of the opening mechanism associated with the deployment bag 128 and subsequent deployment of the parachute.

The retention line 122 is adapted to provide an operable connection between a parachute and the main line 100. The retention line 122 may be a cord or strap, for example, having suitable strength for bearing loads. In one example, the retention line 122 may be a nylon or polyester cord of a desired length, enabling a connection between the parachute canopy and a retention ring 120. The release line 116 is passed through a restraining ring 118 proximate the second end of the main line 100 and secured to the retention ring 120 as well. Thus, a continuous connection is made from the parachute to the aircraft. The retention line 122 may be secured to the parachute prior to the parachute being packed into deployment bag 128, or alternatively, the parachute may be secured to the retention line 116 after being packed into deployment bag 128 using an extension line outside of deployment bag 128.

As described above, the retention line 122 is secured to the main line 100. Both the retention line 122 and the release line 116 are attached to the parachute via the retention ring 120. When a pulling force is applied to the release line 116 by the parachute, a force is transferred to the release pin 206, thereby causing the release pin 206 to be slidably removed and pulled free from the locking loop 202. For example, because the retention line 122 is of a finite length, the force applied to the release line 116 and the release pin 206 during deployment and descent of the parachute (and cargo 126), the parachute will eventually exert a pulling force on the retention line 122. This force is now transferred to the retention line 122 so that the release line 116, the release pin 206 and or any restraining rings or guides will not be damaged while the main line 100 releases from the aircraft via the release line 116 breaking the safety tie 208 and slidably extract and pull free the release pin 206 from the locking loop 202, such that intermediate loop 110 and anchor loop 108 are released from the anchor ring 106 and the deployment line 100 is allowed to breakaway from the aircraft line 102 and aircraft.

Upon reaching a delivery location, the cargo 126 may be deployed from the aircraft by pushing or otherwise forcing the cargo 126 to leave the inside of the aircraft. The main line 100 is a fixed length so that pulling forces are exerted on the main line 100 as the parachute and cargo 126 descends away from the aircraft. Accordingly, a force exerted through the main line 100 causes an opening of the deployment bag 128 and deployment of the parachute canopy. As the cargo 126 descends away from the aircraft, the connection between release line 116 and the parachute and cargo via retention ring 120, results in a pulling force and a pulling free the release pin 206 from the locking loop 202. As described above, upon removal of release pin 206 from the locking loop 202, each release loop cascades loose, thereby releasing the main line 112 from the anchor ring 106 and aircraft. Such a release results in separation of the main line 112 from the anchor line 102.

Figures 4, 5:
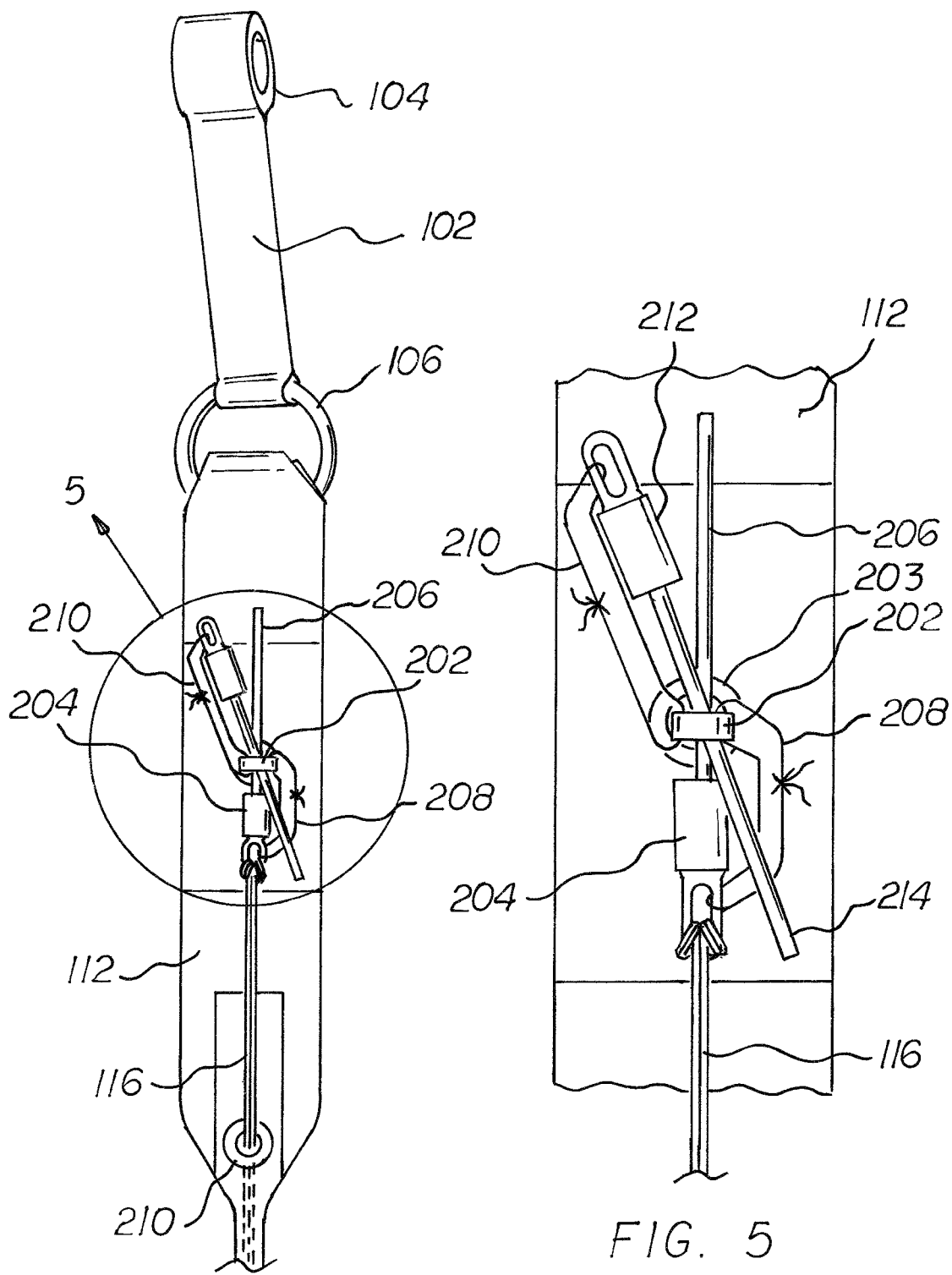
FIG. 4 is rear view of the section of the dual purpose deployment line shown in FIG. 2 in a direct bag configuration.
FIG. 5 is a detail view of the direct bag configuration shown in FIG. 4.

As shown in FIGS. 4 and 5, the deployment line 100 is configured in the "direct bag" configuration, where the deployment line 100 and deployment bag 128 is configured to stay with the aircraft. The cascading release loops 108, 110, 202 are configured to allow the deployment line 100 and deployment bag 128 to remain with the aircraft. Similar to the "release away" configuration, the anchor loop 108 is passed or routed through anchor ring 106, and the intermediate loop 110 passed through the anchor loop 108, with each loop folded over to restrain the loop under it. The intermediate loop 110 may be restrained, as shown in FIGS. 4 and 5, by a locking loop 202 configured to pass through the intermediate loop 110 and through the grommet 203 in the main line 112. As shown in FIGS. 4 and 5, a release pin 206 may be passed through the locking loop 202 to prevent the locking loop 202 from releasing the intermediate loop 110, which releases the anchor loop 108, until the release pin 206 is pulled free. The release pin 206 may further include a safety tie 208 to minimize the risk of accidental or premature removal similar to the "release away" configuration.

In addition, the deployment line may be configured to a "direct bag" configuration by using a locking pin 214. The locking pin 214 is inserted through the locking loop 202. The locking pin 214 may further include a safety tie 210 to minimize the risk of accidental or premature removal. The locking pin 214 is easily visible so that a user may identify whether the parachute system is a "release away" as in FIGS. 2 and 3, or "direct bag" as in FIGS. 4 and 5. Thus, the parachute may be packed the same for either configuration, thereby eliminating mistakes by the rigger.

As explained above, the release pin 206 is connected to a release line 116 so that upon a force being exerted on the release line 116 from the parachute deployment, the release pin 206 is pulled free from the locking loop 202. However, instead of releasing the locking loop 202 and causing the main line 112 to separate from the anchor line 102 as in the "release away" configuration, the locking pin 214 prevents the locking loop 202 from being released. Instead, the retention line 122 experiences the parachute deployment forces and the expendable material attaching the retention line 122 to the parachute via the retention ring 120 breaks thereby releasing the parachute and cargo 126 but retaining the deployment line 100 and deployment bag 128 with the aircraft.

Accordingly, the crewman can select which deployment configuration is required by the mission upon reaching a delivery location. In addition, the crewman can change the configuration by either removing or inserting the locking pin 214.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A dual purpose deployment line for a parachute system, the deployment line comprising;
    a main line;
    a plurality of cascading release loops disposed proximate a first end of the main line wherein the plurality of cascading release loops are configured to be releasably secured to an aircraft anchor ring;
    a second end of the main line adapted to be secured to a parachute deployment bag;
    a release line routed along the main line;
    a release pin secured to a first end of the release line, wherein the release pin is in communication with the plurality of cascading release loops and adapted to pull free and release the cascading release loops from the anchor ring when a parachute is deployed;
    a locking loop adapted to be routed through a grommet in the main line and secured in place by the release pin;
    a second end of the release line adapted to be secured to a retention ring wherein the retention ring is secured to the parachute;
    a retention line secured to the main line;
    a second end of the retention line adapted to be secured to the retention ring;
    a retention line secured to the retention ring wherein a second end of the retention line is secured to the parachute
    and a locking pin adapted to selectively secure the plurality of cascading release loops in place to retain the deployment line to the anchor ring when the parachute is deployed and the release pin is pulled free.

2. The dual purpose deployment line of claim 1, further comprising a release pin safety tie to secure the release pin to the release loops.

3. The dual purpose deployment line of claim 2, further comprising a locking pin safety tie to secure the locking pin to the release loops.

4. A dual purpose deployment line for a parachute system, the deployment line comprising;

a first end of a main line having a plurality of release loops adapted to be releasably secured to an anchor ring of an aircraft;

a release line routed along the main line;

a release pin secured to the release line and adapted to pull the release pin free to release the loops when secured to the anchor ring;

a locking loop adapted to be routed through a grommet in the main line and secured in place by the release pin;

and a locking pin adapted to insert through at least one of the loops to prevent the loops from being released when the release pin is pulled free.

5. The dual purpose deployment line of claim 4, further comprising a second end of the main line adapted to be secured to a parachute deployment bag.

6. The dual purpose deployment line of claim 5, wherein the release line is adapted to be secured to a parachute canopy.

7. The dual purpose deployment line of claim 6, further comprising an anchor line adapted to releasably connect the anchor ring to an aircraft.

8. The dual purpose deployment line of claim 7, wherein the release loops are each comprised of a textile material.

9. A dual purpose deployment line for a parachute system, the deployment line comprising;

a main line;

a release line adapted to be secured to a parachute;

a release pin secured to a first end of the release line; a plurality of cascading release loops disposed on the main line and in communication with the release pin, wherein the release pin is adapted to pull free when the parachute is deployed;

a locking loop adapted to be routed through a grommet in the main line and secured in place by the release pin;

and a locking pin to selectively secure the plurality of cascading release loops in place when the release pin is pulled free.

10. The dual purpose deployment line of claim 9, wherein each of the cascading release loops are adapted to fold over an adjacent loop.

11. The dual purpose deployment line of claim 10, further comprising an anchor line secured to an aircraft and adapted to receive one of the release loops.

12. The dual purpose deployment line of claim 11, further comprising a retention line to enable a connection between the parachute and the main line.

13. The dual purpose deployment line of claim 12, further comprising a release pin safety tie to secure the release pin to the release loops.

14. The dual purpose deployment line of claim 13, further comprising a locking pin safety tie to secure the locking pin to the release loops separate from the release pin.

15. The dual purpose deployment line of claim 14, wherein the release loops are each comprised of a textile material.

16. The dual purpose deployment line of claim 15, wherein the plurality of release loops comprises three or more loops.

17. The dual purpose deployment line of claim 16, further comprising a deployment bag loop adapted to connect to a parachute deployment bag.

18. The dual purpose deployment line of claim 17, the main line further comprising a sleeve adapted to slidably pass the release line to avoid the release line from becoming tangled or otherwise encumbered.

* * * * *